US005600521A

United States Patent [19]

Kondo

[11] Patent Number: 5,600,521

[45] Date of Patent: Feb. 4, 1997

[54] AUTOMATIC PERFORMING APPARATUS WITH POWER SUPPLY CONTROLLER

[75] Inventor: Tetsusai Kondo, Hamamatsu, Japan

[73] Assignee: Kabushiki Kaisha Kawai Gakki Seisakusho, Shizuoka-ken, Japan

[21] Appl. No.: 639,380

[22] Filed: Apr. 26, 1996

Related U.S. Application Data

[63] Continuation of Ser. No. 370,556, Jan. 9, 1995, abandoned, which is a continuation of Ser. No. 950,829, Sep. 24, 1992, abandoned.

[30] Foreign Application Priority Data

Dec. 13, 1991 [JP] Japan .................................... 3-330686

[51] Int. Cl.$^6$ ...................................................... H02H 7/00

[52] U.S. Cl. .................................................. 361/18; 84/22

[58] Field of Search .................................. 361/18; 84/13, 84/22; 364/184; 371/68.2, 71

[56] References Cited

U.S. PATENT DOCUMENTS

| | | | |
|---|---|---|---|
| 3,473,150 | 10/1969 | McClelland | 371/47.1 |
| 4,377,862 | 3/1983 | Koford et al. | 371/32 |
| 4,469,000 | 9/1984 | Fujiwara et al. | 84/115 |
| 4,567,804 | 2/1986 | Sawase et al. | 84/115 |
| 4,593,592 | 6/1986 | Stahnke | 84/21 |
| 4,622,682 | 11/1986 | Kumakura | 375/285 |
| 4,727,592 | 2/1988 | Okada et al. | 395/185.08 |
| 4,744,281 | 5/1988 | Isozaki | 84/602 |
| 4,745,542 | 5/1988 | Baba et al. | 364/184 |
| 4,779,274 | 10/1988 | Takahashi et al. | 371/32 |
| 4,800,548 | 1/1989 | Koishi et al. | 369/54 |
| 4,912,703 | 3/1990 | Sumida | 370/58.2 |
| 4,913,026 | 4/1990 | Kaneko et al. | 84/21 |
| 4,970,928 | 11/1990 | Tamaki | 84/21 |
| 5,016,513 | 5/1991 | Stahnke | 84/19 |
| 5,022,301 | 6/1991 | Stahnke | 84/21 |
| 5,072,644 | 12/1991 | Isozaki et al. | 84/609 |
| 5,083,491 | 1/1992 | Fields | 84/21 |
| 5,164,532 | 11/1992 | Ishii et al. | 84/639 |
| 5,196,639 | 3/1993 | Lee et al. | 84/603 |
| 5,210,367 | 5/1993 | Taguchi et al. | 84/22 |

FOREIGN PATENT DOCUMENTS

| | | |
|---|---|---|
| 53-20315 | 2/1978 | Japan . |
| 53-102020 | 9/1978 | Japan . |
| 54-17011 | 2/1979 | Japan . |
| 55-84088 | 6/1980 | Japan . |
| 58-18691 | 2/1983 | Japan . |
| 58-179894 | 10/1983 | Japan . |
| 61-128295 | 6/1986 | Japan . |
| 61-292431 | 12/1986 | Japan . |
| 62-15840 | 4/1987 | Japan . |
| 63-37395 | 2/1988 | Japan . |
| 63-131632 | 6/1988 | Japan . |
| 63-217908 | 8/1988 | Japan . |
| 63-44867 | 11/1988 | Japan . |
| 63-301997 | 12/1988 | Japan . |
| 64-44936 | 2/1989 | Japan . |
| 64-247666 | 9/1989 | Japan . |
| 64-291944 | 11/1989 | Japan . |
| 1-332912 | 12/1989 | Japan . |
| 3-020797 | 1/1991 | Japan . |
| 3-194597 | 8/1991 | Japan . |
| 2164192 | 3/1986 | United Kingdom . |
| WO80/02886 | 12/1980 | WIPO . |

*Primary Examiner*—Jeffrey A. Gaffin
*Assistant Examiner*—Sally C. Medley
*Attorney, Agent, or Firm*—Davis and Bujold

[57] ABSTRACT

An automatic performing apparatus that executes recording and reproduction of a performance includes a diagnostic signal generator for sending a power supply control circuit at least one of normal and abnormal diagnostic signals indicating whether a controller is normally executing a program. The power supply control circuit controls the power supplied to a drive circuit by interrupting the power or reducing the power to such a low level that the drive circuit is not damaged by a prolonged power supply if the operation of the controller is determined abnormal based on the diagnostic signal generated by the diagnostic signal generator.

11 Claims, 7 Drawing Sheets

AUTOMATIC PERFORMING APPARATUS WITH POWER SUPPLY CONTROLLER

This application is a continuation of application Ser. No. 08/370,556 filed Jan. 9, 1995, now abandoned which is a continuation application of application Ser. No. 07/950,829 filed Sep. 24, 1992, now abandoned.

BACKGROUND OF THE INVENTION

The present invention relates to an automatic performing apparatus. More particularly, the present invention relates to an automatic performing apparatus which can prevent damage to the apparatus caused by software and hardware malfunctions, by cutting off the power supply to a recording and/or reproducing devices.

A conventional automatic performing apparatus comprises a CPU for generating electrical signals which serve as instructions controlling the start, key stroke intensity, and end of each key stroke and key actuators which typically include solenoids for converting electrical energy from a power source into mechanical energy according to the instructions from the CPU. A performance is, therefore, conducted by the actuators executing performance instructions from the CPU.

Occasionally, a solenoid activated upon an activation instruction from the CPU cannot be de-activated even after the CPU has given a de-activation instruction in such a conventional automatic performing apparatus. This happens when the de-activation instruction is not executed due to various causes including noise over-riding or canceling the instruction. If a solenoid receives excessive energy or does not receive a de-activation instruction, it may be overheated and, in the worst case, permanently damaged.

This problem has been often dealt with by giving another de-activation instruction if a solenoid has been activated for too long a time period. More particularly, a memory provided in the apparatus has data of time during which solenoids are allowed to be activated. This solenoid activation time is set slightly longer than the actually necessary time for sufficiently activating solenoids. Therefore, if a solenoid is still activated after the solenoid activation time indicated in the above data stored in the memory, the CPU gives another instruction to deactivate the solenoid.

Since this method attempts to solve the problem in software, it is only workable if a solenoid is not deactivated due to noise, but not workable if the CPU itself malfunctions or stops executing instructions.

SUMMARY OF THE INVENTION

An object of the present invention is to provide an automatic performing apparatus that can prevent drive means comprising solenoids from being overheated and damaged due to excessive power supplied to the drive means which is caused by a malfunction or a hang-up of a CPU.

The above and other related objects are realized by an automatic performing apparatus that executes recording or reproduction instructions according to a mode selected from either a recording mode or a reproduction mode. The automatic performing apparatus comprises drive means 100, FIG. 1, for driving a recording or reproduction mechanism according to the selected mode, a power source 102 for supplying electrical power to drive the drive means, control means 104 for controlling the operation of the drive means, and diagnostic signal generation means 106 for generating at least one of normal and abnormal diagnostic signals indicating the control over the drive means by the control means is normal or abnormal. Power supply reduction means 108 interrupts the power supplied from the power source 102 to the drive means 100 or reduces the power supply to the drive means 100 to a level at which a prolonged supply of power does not damage the drive means if the control of the control means is determined abnormal based on the diagnostic signal generated by the diagnostic signal generation means. The power supply reduction means 108 is provided on the power supply line between the power source and the drive means.

In the operation of the automatic performing apparatus of the present invention, the power supply reduction means 108 receives at least one of the normal and abnormal diagnostic signals generated by the diagnostic signal generation means 106 provided on the power supply line to the drive means 100. Then, the power supply reduction means 108 interrupts the power supply to the drive means or reduces the power supply to such a low level that the drive means are not damaged by a prolonged power supply if the control over the drive means by the control means is determined abnormal based on the diagnostic signal generated by the diagnostic signal generation means 106.

Being provided with the diagnostic signal generation means 106 and the power supply reduction means 108 for interrupting or substantially reducing the power supply to the drive means, the automatic performing apparatus of the present invention prevents the drive means from overheating and subsequently damaged by excessive supply of power.

In the conventional apparatus, the CPU (the control means) sends instructions to de-activate the drive means to prevent damage due to overheating. In the present invention, on the other hand, the power supply reduction circuit, independent from the CPU, reduces the power supply to the drive means based on at least one of the normal and abnormal diagnostic signals sent by the diagnostic signal generation means. In this way, even if the control means itself malfunctions or has a hang-up, overheating and subsequent damage of the drive means can be avoided.

DETAILED DESCRIPTION OF THE PREFERRED EMBODIMENTS

An automatic performing piano embodying the present invention will be described referring to the attached drawings.

Figure 1:
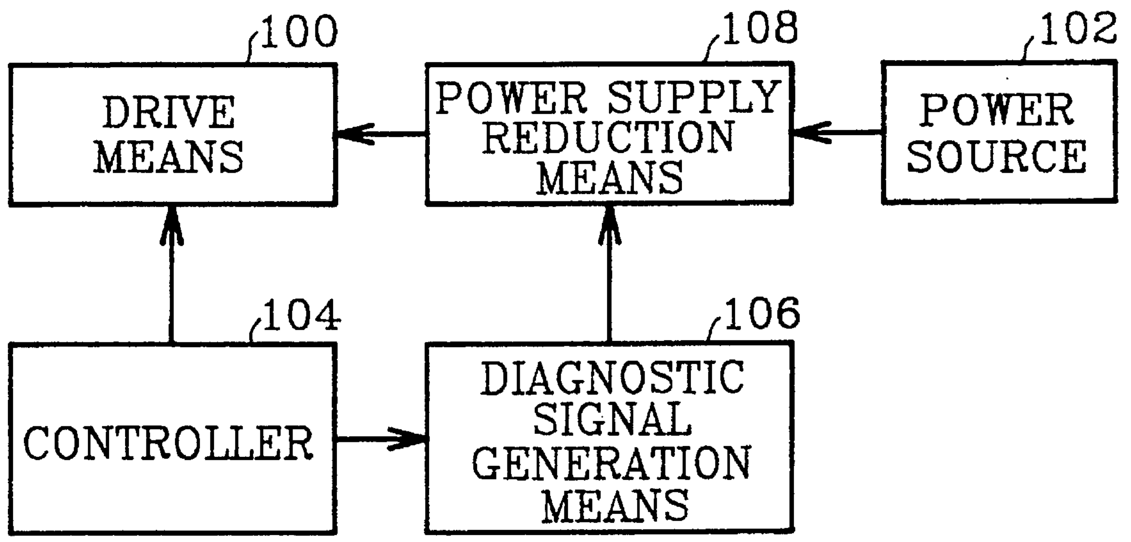
FIG. 1 is a block diagram of the automatic performing apparatus according to the present invention.
Figure 2:
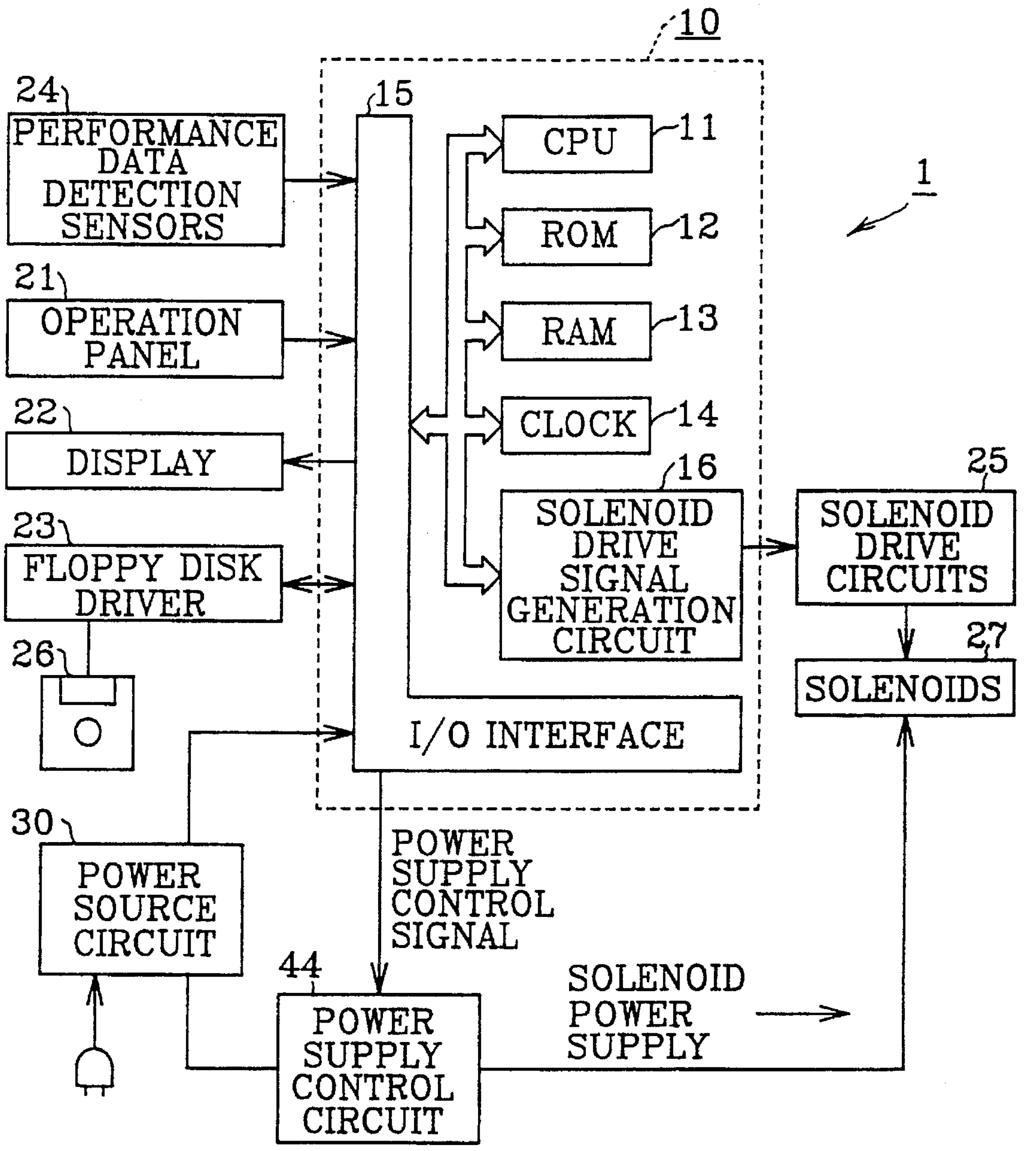
FIG. 2 is a block diagram of an automatic performing piano according to a first embodiment of the present invention.
Figure 6:
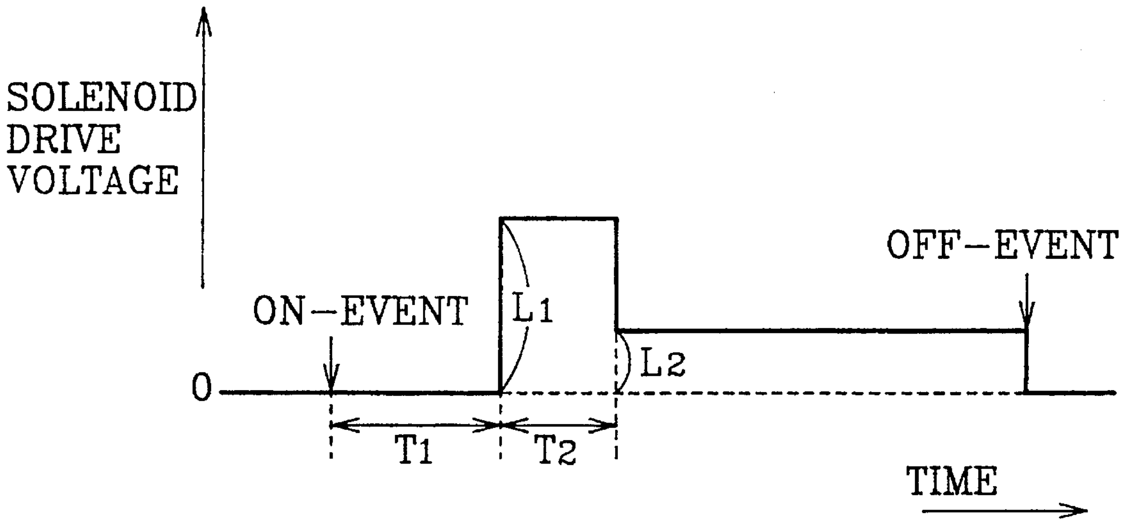
FIG. 6 is a graph showing the change of an average solenoid drive voltage from a key depression (on-event) to a key release (off-event) plotted against time.

As shown in FIG. 2, an automatic piano 1 for recording and reproducing musical performances includes a controller 10, which includes a CPU 11, a ROM 12, a RAM 13, a clock 14, an input/output interface (hereinafter I/O interface) 15, and a solenoid drive signal generating circuit 16 comprising a digital circuit for generating a solenoid drive signal as shown in FIG. 6. The solenoid drive signal generating circuit 16 generates a solenoid drive signal by changing the duty cycle of a control signal, alternately changing between a high and a low level based on performance data as explained below.

The automatic piano 1 also includes a control panel 21 connected to the I/O interface 15, a display 22, a floppy disk driver 23, performance data detection sensors 24 including photo sensors for detecting key movements. Solenoid drive circuits 25 are connected to the solenoid drive signal generating circuit 16.

Figure 3:
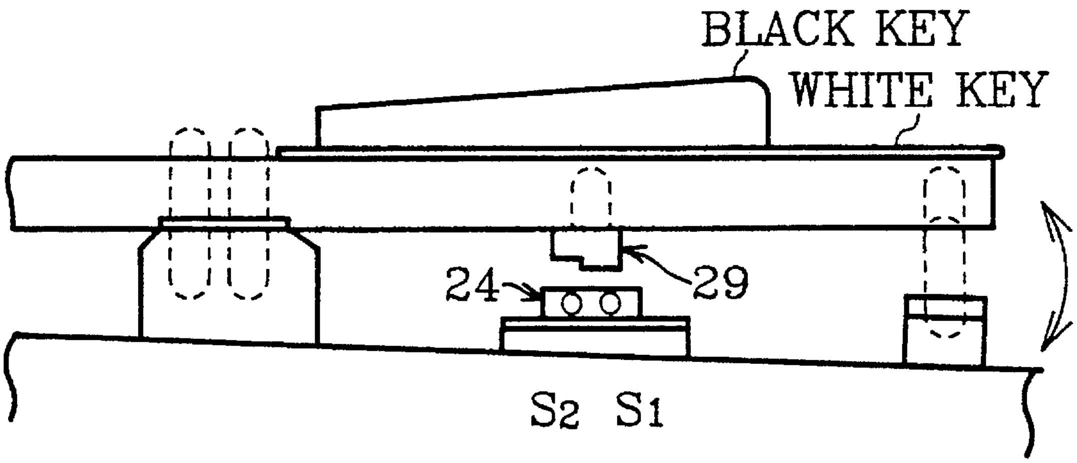
FIG. 3 is an illustration of a performance data detection sensor in the first embodiment shown in FIG. 3.

As shown in FIG. 3, each performance data detection sensor 24 is composed of a stepped shutter 29 fixed on the underside of the corresponding, depressable key. Two sensor light emitters S1 and S2 and two corresponding sensor light detector elements (not shown) are disposed under the key on the board supporting the key. The sensor 24 measures how long the shutter blocks the light path defined by the sensor light emitters S1 and S2 and the sensor elements. The sensor 24 thus measures the depression velocity of the key.

To depress or release a plurality of keys simultaneously, an assigner composed of a plurality of channels for storing and sending instructions is provided in the RAM 13. The plurality of channels in the assigner temporarily store key depression or key release instructions about the plurality of keys from the CPU 11, and send the instructions to the relevant solenoid drive circuits 25 corresponding to the relevant keys at the proper time.

In this embodiment, the number of the channels of the assigner is less than that of all the keys since a player cannot play all the keys at the same time.

The control panel 21 is provided for an operator to select an operation mode from recording, reproduction, and stop modes, and to enter into the controller 10 various commands and settings of the piano 1. In the recording mode, performance data received from the performance data detection sensors 24 is written to a floppy disk 26 set in the floppy disk driver 23.

In the reproduction mode, on the other hand, the performance data stored on the floppy disk 26 is read out. Solenoid drive signals are then generated based on the readout performance data to drive the relevant solenoids 27 for activating the associated keys. Thus, the piano 1 having the above construction executes recording and reproduction.

Each solenoid 27 is held in its original or first position by a spring or some other similar biasing means. When activated, the solenoid 27 moves to a predetermined second position against the biasing of the biasing means to cause a hammer to strike a string, thus emitting a sound.

For the writing of the performance data to the floppy disk 26, this embodiment of the present invention adopts the "event record" method wherein performance data is recorded if there is any change in the status of a key. Specifically, the performance data, in case of an on-event, includes data concerning a key depression, the key number, the timing of the key depression, and the key depression intensity calculated based on depression velocity, detected by the sensor 24. The performance data, in case of an off-event, includes data concerning key release, the key number, and the timing of a key release. These data are chronologically written to the floppy disk 26 as a series of data associated with one event.

It is noted that an on-event denotes performance data associated with a key depression while an off-event denotes a key release throughout this specification.

A power source circuit 30 is also provided to supply electricity to the solenoids 27 and the performance data detection sensor 24 as well as the controller 10 for the above operations. The connection among the power source circuit 30, the controller 10, and the solenoids 27 are shown in the circuit diagram of FIGS. 2 and 4.

Figure 4:
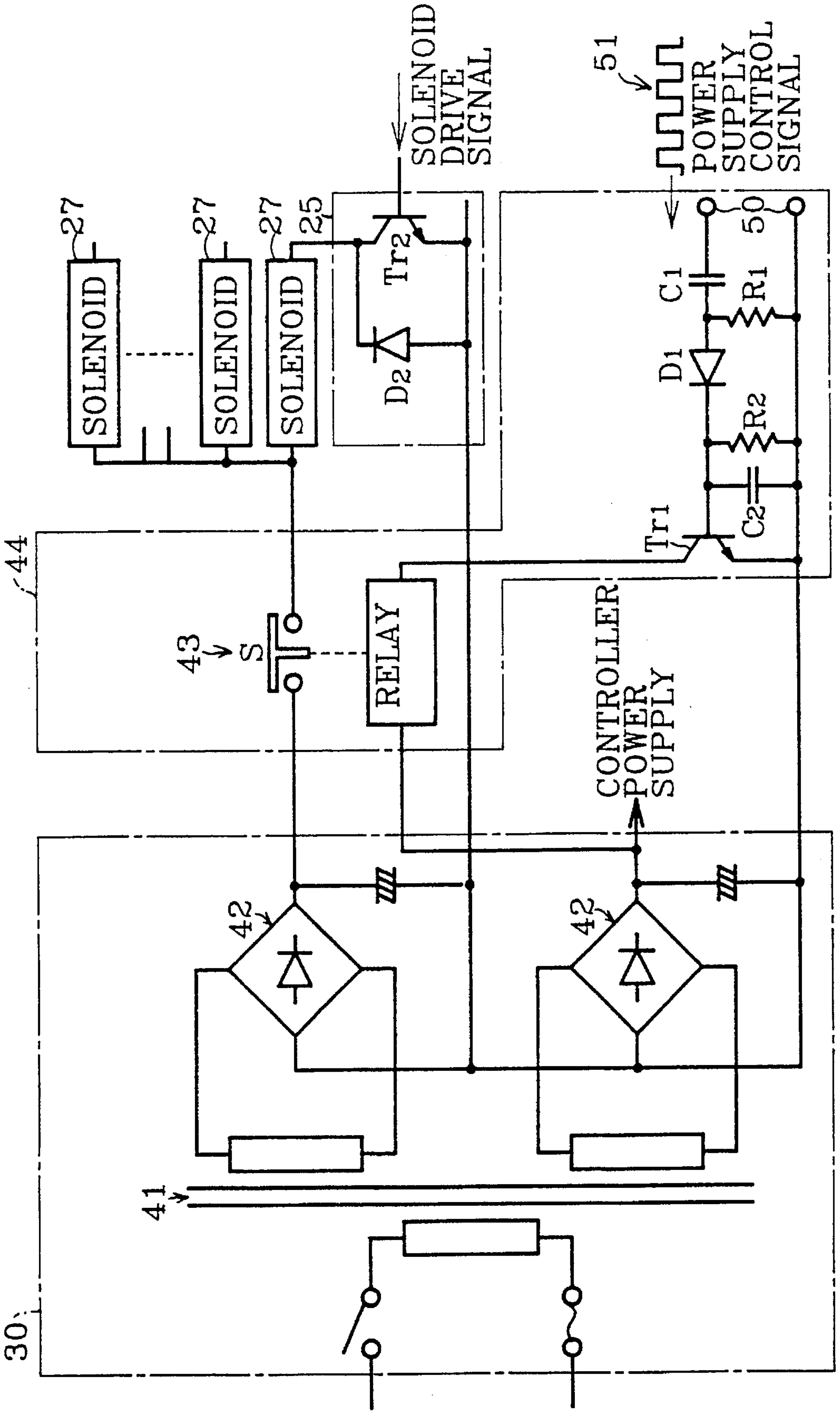
FIG. 4 is a schematic diagram of one embodiment of an electrical circuit generating a power supply control signal.

The power source circuit 30 includes transformers 41 and rectifiers 42. As shown in FIGS. 2 and 4, the power source circuit 30 supplies power to the controller 10 and the solenoids 27. Provided between the power source circuit 30 and the solenoids 27 is a power supply reduction (interrupt) circuit 44, which functions as a power supply reduction means. The power supply control circuit 44 is composed of a power source remote input terminal 50 for receiving a square wave power supply control signal 51 from the CPU 11, a relay 43 for interrupting the power supply from the power source circuit 30 to the solenoids 27, and a switching transistor Tr1 whose collector, base, and emitter are connected to the relay 43, the high potential side of the power source remote terminal 50, and the grounding side of the power source remote terminal 50, respectively.

The power supply control circuit 44 also includes a capacitor C1 one of whose terminals is connected with the high potential side of the power source remote terminal 50 and the whose other terminal is connected via a diode D1 to the transistor Tr1 for disrupting the circuit 44 to turn off the transistor Tr1 if the power supply control signal includes only a direct current.

Also included is a resistor R1 one of whose terminals is connected to a point between the above latter terminal of the capacitor C1 and the diode D1 and whose other terminal is connected with the grounding side of the power source remote terminal 50 for composing a high pass filter along with the capacitor C1, the rectifying diode D1, whose anode is connected to the capacitor C1 and the resistor R1 and whose cathode is connected to the base of the transistor Tr1, a smoothing capacitor C2, and a resistor R2 for discharging the capacitor C2. The capacitor C2 and the resistor R2 are connected in parallel to the base terminal and the emitter terminal of the transistor Tr1.

In the power supply control circuit 44 thus constructed, the capacitor C1 does not block a power supply control signal as long as it is a rectangular or square alternating signal. The alternating signal maintains the base terminal of the transistor Tr1 at a high electric potential via the diode D1 and the capacitor C2, keeping the transistor Tr1 "on" and thus the relay 43 closed. On the other hand, if the power supply control signal becomes a direct signal by a CPU malfunction or hang-up during a program execution, the capacitor C1 blocks such direct signal, causing the base of the transistor Tr1 to be at a low electric potential and thus the transistor Tr1 to be turned "off". This in turn causes the relay 43 to open, interrupting the supply of power to the solenoids.

In the above circuit of FIG. 4, while the relay 43 is closed, power is supplied to solenoids 27 if a solenoid drive signal is sent from the controller 10 to the relevant solenoid drive circuit 25 comprising a transistor Tr2 and a diode D2. The power supply is cut off if there is no incoming solenoid drive signal. On the other hand, if the relay 43 is open, power is not supplied to any of the solenoids 27.

The recording/reproduction program of the present embodiment will be explained below referring to the flowcharts of FIGS. 5A and 5B.

Figure 5A:
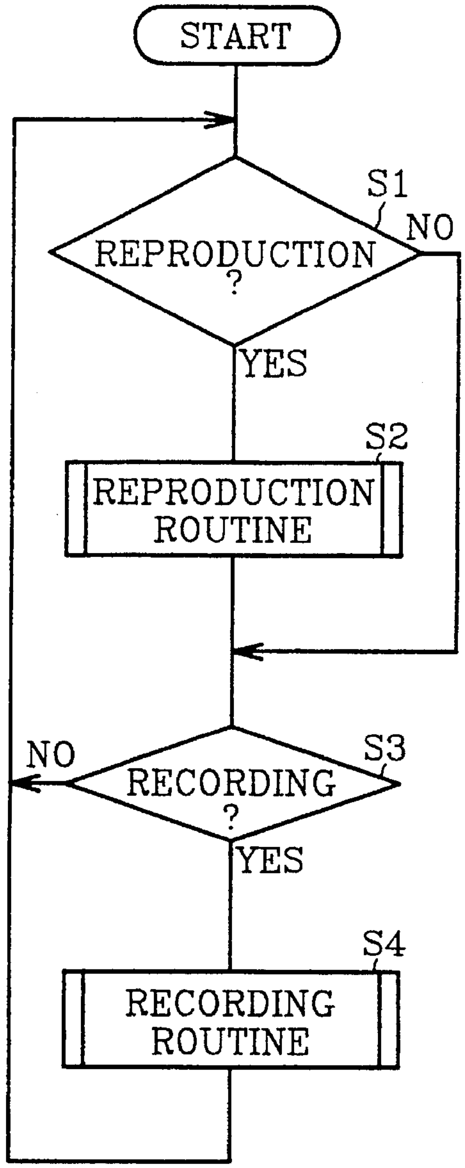
FIGS. 5A and 5B are flowcharts of a recording/reproduction program incorporating power supply control according to the present invention.

Referring first to the flowchart of FIG. 5A, the program initially determines if the current selected mode is a reproduction mode at step S1. If yes, the process goes to step S2 wherein the CPU carries out a reproduction routine described below in FIG. 5B. If no, the process skips step S2 and goes to step S3, at which step the CPU 11 determines if a recording mode has been selected. If yes at step S3, the CPU 11 then carries out a recording routine at step S4. This processing from step S1 to step S4 is repeatedly executed at a cycle of about every 5 msec.

Figure 5B:
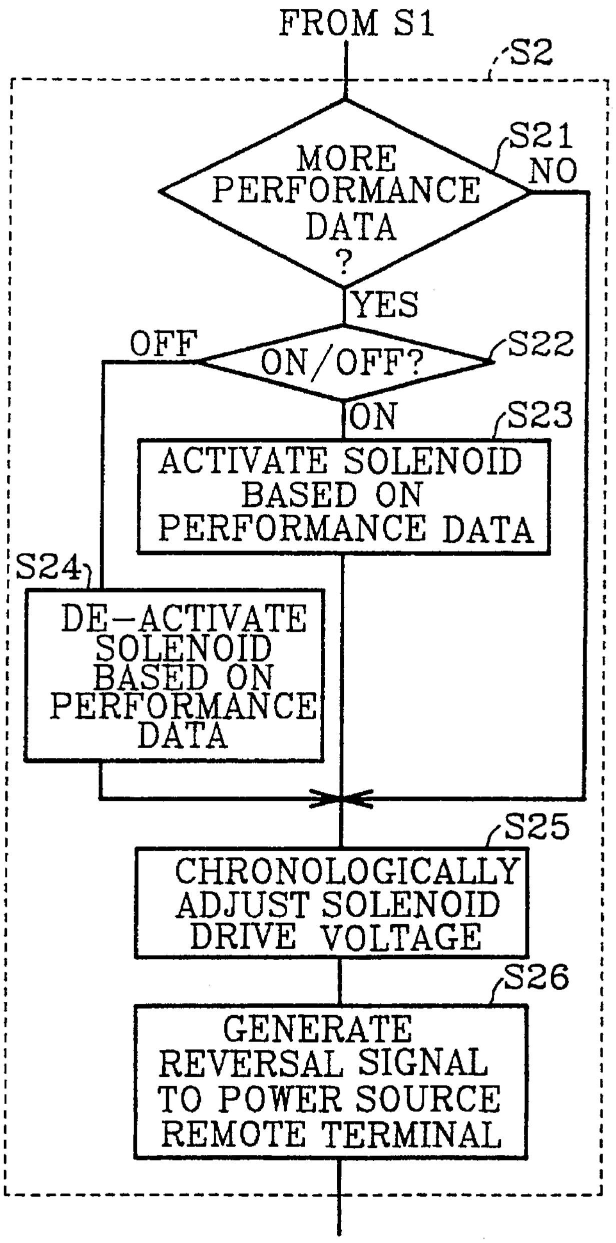

In the reproduction routine as shown in FIG. 5B, it is determined at step S21 if there is more performance data yet to be processed. If yes at step S21, the CPU 11 at step S22 determines whether the unprocessed performance data is an on-event or off-event. After step S22, the CPU 11 runs an instruction to send a solenoid drive signal to activate (at step S23) or de-activate (at step S24) the relevant solenoid 27 depending on the result of the determination made at step S22. In this embodiment, the solenoid drive signal causes a solenoid 27 to drive at a intensity that matches the key depression intensity data in the performance data.

If it is determined NO at step S21, or after the process is through steps S23 or S24, the power supply is chronologically adjusted for all the currently activated solenoids 27.

Although the flowcharts of FIGS. 5A and 5B represent the process of the control over the overall operation of the automatic performing piano 1 by the CPU 11, explained below is the process of activating a given solenoid 27 from the on-event (step S23) through chronological adjustment of the solenoid drive wattage (step S25) to the off-event.

In the operation of the solenoids 27, the CPU 11 allocates performance instructions based on performance data to channels of the assigner provided in the RAM 13. The assigner in turn sends solenoid drive signals based on the performance instructions via the solenoid drive signal generation circuit 16 to the relevant solenoid drive circuits 25 in the chronological order according to the occurrence timing of the performance instructions.

The graph of FIG. 6 shows the change of an average solenoid drive voltage (average duty voltage) from a key depression (on-event) to a key release (off-event) plotted against time. First of all, there is a compensation time $T_1$ between the occurrence of an on-event and the supply of voltage to the solenoid. The higher the depression intensity is, the shorter is the time in which the solenoid 27 reaches the predetermined position upon activation. Therefore, it is necessary to delay the activation of the solenoids 27 by a compensation time $T_1$ according to the respective key depression intensity, to maintain accurate intervals between on-events. After the compensation time $T_1$ from the on-event, a voltage $L_1$ corresponding to the key depression intensity is supplied to the solenoid 27 for a time $T_2$. Then, within the time $T_2$, the solenoid 27 rises against the bias of the biasing means to the position where the solenoid 27 causes a hammer to strike a string.

After the time $T_2$ required for the solenoid 27 to rise to the proper position, the solenoid 27 has only to remain at the above position while resisting the bias. Therefore, at the expiration of the time $T_2$, the voltage $L_1$ is reduced to voltage $L_2$. The voltage $L_2$ required to maintain the solenoid 27 at the position are much less than the voltage $L_1$ required to initially raise the solenoid 27 to the desired position. The power reduction in the voltage $L_2$ is energy saving and also protects the solenoid 27 from damage due to overheating when the key release instruction is not executed based on the off-event after a long time from the on-event.

As also shown in FIG. 6, the solenoid drive signal is cut off to allow the solenoid 27 to be brought back to its original (non-activation) position by the biasing means corresponding to the occurrence timing of the key release (off-event).

After the solenoid drive voltage of the solenoid 27 is adjusted chronologically from the on-event to the off-event at step S25, the process goes on to the last step of the reproduction routine, step S26, at which a reversal signal is sent to a power source remote terminal 50 of the I/O interface 15 based on the instruction from the CPU 11. More particularly, an instruction to reverse the current level, either high or low, of the power supply control signal is executed at step S26. In this way, the CPU 11 causes an alternating signal to be generated to the power source remote terminal 50 at every execution cycle of the reproduction routine as a power supply control signal as long as the routine is properly executed.

According to the above reproduction routine, the controller 11 sends the power supply control circuit 44 the power supply control signal 51 (an alternating signal typically having a frequency 100 Hz). This causes the relay 43 to be continuously closed. However, if the CPU 11 ceases operating, the above reproduction routine cannot be executed any further. Subsequently, since the high-low level reverse instruction is not executed, the power supply control signal will not be reversed, either. This signal, being a direct signal, will then be blocked by the capacitor C1. Accordingly, the transistor Tr1 will not be turned on. This in turn causes the relay 43 to be open so that power will not be supplied to the solenoids 27 even if a solenoid drive signal is generated.

If the reproduction routine is not executed, the power supply control signal is not reversed. Therefore, the solenoids 27 are not supplied with power when the recording mode is on because the relay 43 remains open in this case also.

In the automatic performing piano 1 of the embodiment thus constructed, the power supply to the solenoids 27 can surely be cut off if a hang-up occurs during the execution of the reproduction routine. This protects the solenoids 27 from damage caused by overheating. As for damages to the solenoids 27 caused by noise overcoming an off-event, the processing at step S25 prohibits such phenomenon by chronologically adjusting the drive voltage of the solenoid 27 as in the conventional method.

Figure 7:
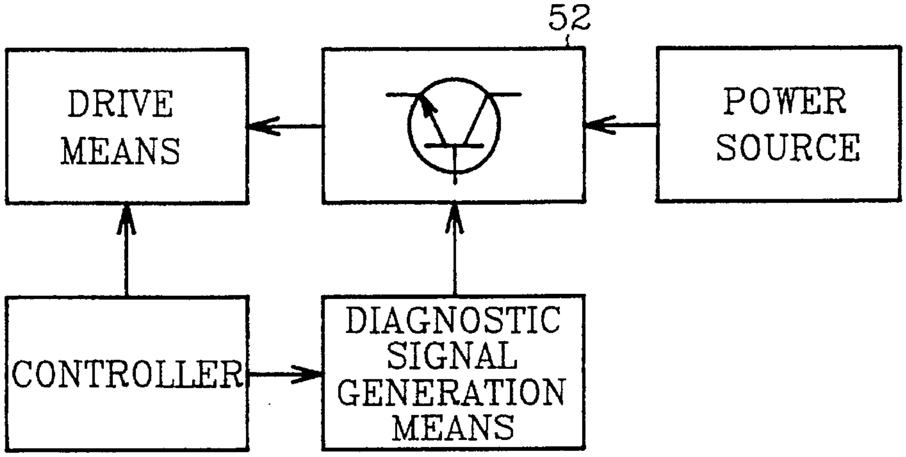
FIG. 7 is a block diagram of the automatic performing apparatus according to a second embodiment of the present invention.

In the above first embodiment, the CPU 11 sends alternating signals only when the program is executing normally while the power supply reduction means 50 comprises the filter circuit, the transistor Tr1, and the relay 43. In a second embodiment, a switching transistor 52, FIG. 7, is substituted for the relay 43 of the first embodiment. The second embodiment has a more compact construction than the first embodiment.

Figure 8:
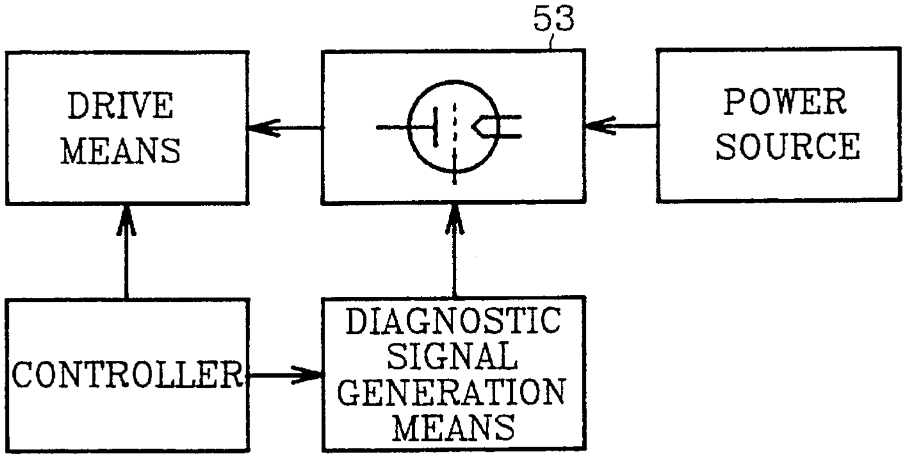
FIG. 8 is a block diagram of the automatic performing apparatus according to a third embodiment of the present invention.

In a third embodiment shown in FIG. 8, a vacuum tube 53 is used as the power supply reduction means.

Figure 9:
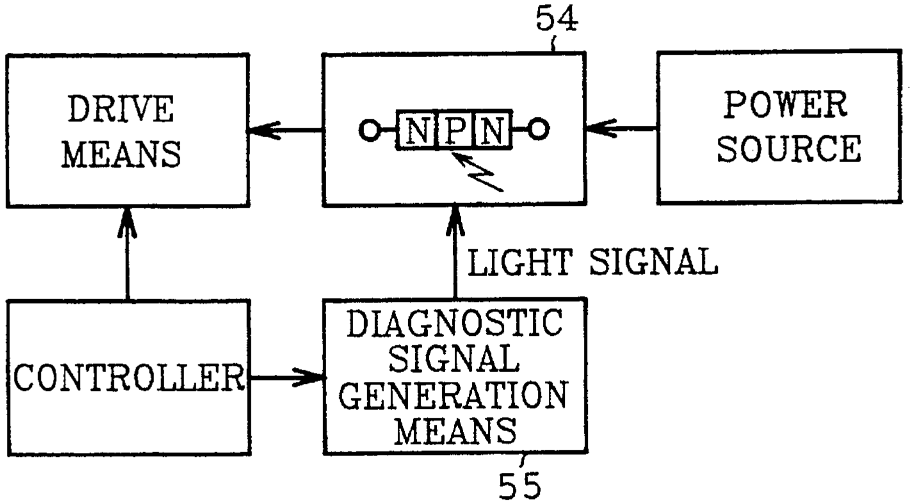
FIG. 9 is a block diagram of the automatic performing apparatus according to a fourth embodiment of the present invention.

Shown in FIG. 9 is a fourth embodiment, in which the power supply reduction means comprises a photoelectric transfer element 54 such as a photo transistor, a phototube, a photomultiplier tube, or a photoelectromotive cell. The diagnostic signal generation circuit 55 comprises a light-emitting element that emits light either when the control means is operating normally or abnormally. This embodiment minimizes energy loss because less wiring is required than in the other embodiments.

Thermal, mechanical, or chemical signals, as well as electrical and photo signals, may suffice as a diagnostic signal indicative of the operation of the control means, i.e. either normal or abnormal. If these alternative signals are used, the diagnostic signal generation means will accordingly be thermal, mechanical, chemical, electrical or photo sensitive.

Moreover, if the reproduction mode is changed to another mode while solenoids 27 are activated, the solenoids 27 are automatically de-activated. This is because only during the reproduction mode as shown in FIG. 5B is a reversal signal generated and therefore the relay 43 remains closed to continue the supply power to the solenoids 27 only in the reproduction mode Having described a preferred form of the invention, it should be understood that various changes and modifications may be made without departing from the spirit and scope of the invention.

For instance, the present invention is applicable to the recording routine as well as the reproduction routine. A relay kept open by an alternating signal and its control circuit may be incorporated into the power source circuit of the performance data detection sensors 24 as that of the solenoids 27. By executing the same processing in the recording routine as at step S26, the power supply to the sensors 24 can be controlled in the same manner as that to the solenoids 27. This will prevent unintended power supply to the sensors 27, which may shorten the lives of the sensors 27, if a CPU hang-up or a mode change occurs. Also, this invention may only be applied to the recording routine.

Similarly, the present invention may be applied to a sequencer so that the power is shut down to sound sources to prevent damage thereto in case of a CPU hang-up or a mode change.

As explained above, the automatic performing apparatus can securely prevent damage to solenoids and other components caused by unintended, excessive power in the case of a system malfunction such as a CPU hang-up.

What is claimed is:

1. An automatic performing apparatus for executing at least one of performance recording and performance reproduction, said automatic performing apparatus comprising:

drive means, coupled to at least one of a recording unit and a reproduction unit, for providing a control signal to at least one of said recording unit and said reproduction unit;

a power source coupled to said drive means for supplying power to said drive means;

controller means being coupled to said drive means for controlling operation of said drive means, and said controller means providing a diagnostic signal which fluctuates between a high level and a low level, during normal operation of said controller means, and lacking said fluctuation, during abnormal operation of said controller means; and power supply control means being coupled to said controller means for receiving said diagnostic signal from said controller means, and said power supply control means being coupled between said power source and said drive means for controlling, depending upon said diagnostic signal, power supply to said drive means such that, i) when said diagnostic signal fluctuates, said power supply control means facilitates the supply of power from said power source to said drive means, and ii) when said diagnostic signal lacks said fluctuation, said power supply control means interrupts the supply of power from said power source to said drive means.

2. An automatic performing apparatus according to claim 1, wherein said power supply is an electrical current and said power supply control means includes a switch located in an electrical flow path between said power source and said drive means, and said switch, when in a first position, facilitates power supply from said power source to said drive means and said switch, when in a second position, interrupts power supply from said power source to said drive means.

3. An automatic performing apparatus according to claim 2, wherein said power supply control means comprises:

a power source remote input terminal, having a high potential side and a grounding side, coupled to said controller means for receiving said diagnostic signal from said controller means;

a filter circuit operably connected to said power source remote input terminal; and a switching transistor operably connecting said filter circuit to said switch such that, i) said diagnostic signal, when fluctuating, flows through said filter circuit and maintains a base terminal of said switching transistor at a high electric potential which maintains said switch in said first position to facilitate the supply of power from said power source to said drive means, and ii) said diagnostic signal, when lacking said fluctuation, is blocked by said filter circuit which reduces the electric potential of said base terminal of said switching transistor to a low electric potential, causing said switch to move from said first position to said second position to interrupt the supply of power from said power source to said drive means.

4. An automatic performing apparatus according to claim 3, wherein said filter circuit comprises:

a first capacitor having a first terminal and a second terminal, said first terminal is coupled to said high potential side of said power source remote input terminal, and said second terminal is connected, via a diode, to said switching transistor; and a first resistor having a first terminal and a second terminal, said first terminal is connected to a location between said second terminal of said first capacitor and said diode, and said second terminal is connected to said grounding side of said power source remote input terminal.

5. An automatic performing apparatus according to claim 4, wherein said power supply control means further comprises:

a smoothing capacitor, a second resistor; and both said smoothing capacitor and said second resistor are connected in parallel to a base terminal and an emitter terminal of said switching transistor.

6. An automatic performing apparatus according to claim 1, wherein said controller means includes means for reducing a level of a control signal initially supplied to said drive means, following an initial energization period of time, to a lower energy saving level which is sufficient to maintain energization of one of the recording unit and the reproduction unit.

7. An automatic performing apparatus according to claim 1, wherein said power supply control means includes a device selected from the group consisting of a thermal device, a mechanical device, a chemically operated device, an electrical device and a light sensitive control device, and said device is positioned and arranged for controlling power supply from said power source to said drive means according to said diagnostic signal.

8. An automatic performing apparatus according to claim 7, wherein said power supply control means includes a vacuum tube which is coupled between said power source and said drive means and arranged to receive said diagnostic signal, and said a vacuum tube, when in an operative condition, facilitates the supply of power from said power source to said drive means and, when in an inoperative condition, interrupts the supply of power from said power source to said drive means.

9. An automatic performing apparatus according to claim 1, wherein said controller means includes a central processing unit which generates said diagnostic signal.

10. An automatic performing apparatus according to claim 1 wherein, during use, said controller means continuously provides said diagnostic signal to said power supply control means.

11. An automatic performing apparatus for executing at least one of performance recording and performance reproduction, said automatic performing apparatus comprising:

drive means being coupled to at least one of a recording unit and a reproduction unit for providing a control signal to at least one of said recording unit and said reproduction unit;

a power source being coupled to said drive means for supplying power to said drive means;

controller means being coupled to said drive means for controlling operation of said drive means, and said controller means providing a diagnostic signal; and power supply control means being coupled to said controller means for receiving said diagnostic signal from said controller means, and said power supply control means being coupled between said power source and said drive means for controlling, depending upon said diagnostic signal, the supply of power to said drive means;

wherein said controller means continuously provides said diagnostic signal to said power supply control means, said controller means has a functioning routine which, during normal operation, alters a level of said diagnostic signal at every execution cycle of said functioning routine to cause said diagnostic signal to fluctuate during repeated execution cycles and, when said diagnostic signal fluctuates, said power supply control means supplies power from said power source to said drive means and, when said diagnostic signal lacks said fluctuation, said power supply control means interrupts the supply of power from said power source to said drive means.

* * * * *